(12) United States Patent
Kromer

(10) Patent No.: US 12,220,743 B2
(45) Date of Patent: Feb. 11, 2025

(54) EQUIPMENT AND METHOD FOR DEPOSITING PARTICLES USING LASER SHOCKWAVES

(71) Applicants: UNIVERSITE DE BORDEAUX, Bordeaux (FR); CENTRE NATIONAL DE LA RECHERCHE SCIENTIFIQUE—CNRS-, Paris (FR); ECOLE NATIONALE SUPERIEURE D'ARTS ET METIERS (ENSAM), Paris (FR); INSTITUT POLYTECHNIQUE DE BORDEAUX, Talence (FR)

(72) Inventor: Robin Kromer, Villenave d'Ornon (FR)

(73) Assignees: UNIVERSITE DE BORDEAUX, Bordeaux (FR); CENTRE NATIONAL DE LA RECHERCHE SCIENTIFIQUE—CNRS, Paris (FR); ECOLE NATIONALE SUPERIEURE D'ARTS ET METIERS, Paris (FR); INSTITUT POLYTECHNIQUE DE BORDEAUX, Talence (FR)

( * ) Notice: Subject to any disclaimer, the term of this patent is extended or adjusted under 35 U.S.C. 154(b) by 245 days.

(21) Appl. No.: 17/755,448

(22) PCT Filed: Oct. 27, 2020

(86) PCT No.: PCT/FR2020/051941
§ 371 (c)(1),
(2) Date: Apr. 29, 2022

(87) PCT Pub. No.: WO2021/084201
PCT Pub. Date: May 6, 2021

(65) Prior Publication Data
US 2022/0355379 A1 Nov. 10, 2022

(30) Foreign Application Priority Data
Oct. 29, 2019 (FR) .................................... 19 12143

(51) Int. Cl.
*B22F 10/36* (2021.01)
*B22F 3/087* (2006.01)
(Continued)

(52) U.S. Cl.
CPC .............. *B22F 10/36* (2021.01); *B22F 3/087* (2013.01); *B22F 12/43* (2021.01); *B33Y 10/00* (2014.12); *B33Y 30/00* (2014.12)

(58) Field of Classification Search
None
See application file for complete search history.

(56) References Cited

U.S. PATENT DOCUMENTS 6,060,127 A * 5/2000 Tatah ..................... H05K 3/046
427/256
2015/0140229 A1* 5/2015 Hosseini ............. B32B 38/0008
427/527
(Continued)

FOREIGN PATENT DOCUMENTS

CN 105271106 1/2016
DE 19503178 10/1995
(Continued)

OTHER PUBLICATIONS

"Notice of Reasons for Refusal" mailed Jun. 18, 2024 for Japanese Patent Application No. 2022-525413.*
International search report for PCT/FR2020/051941 dated Jan. 11, 2021.

*Primary Examiner* — Charles Capozzi
(74) *Attorney, Agent, or Firm* — Perman & Green, LLP

(57) ABSTRACT

Equipment for selectively depositing, by shockwave-induced spraying, at least one particle on a deposition surface of a receiver substrate. The equipment including at least one laser source that emits a laser beam, a substrate carrier to which the substrate is fastened, a shockwave-generating layer having a first surface oriented toward the laser beam and a second surface oriented toward the deposition surface of the substrate, an optical system for directing and focusing the laser beam toward a focal region of the first surface. The second surface including a plurality of cavities, each cavity housing at least one particle. The laser beam generates a (Continued)

plasma in the focal region on the first surface and a shockwave that propagates within the generating layer from the first surface to the second surface in order to spray at least one particle in the direction of the deposition surface of the substrate.

15 Claims, 4 Drawing Sheets

(51) Int. Cl.
*B22F 12/43* (2021.01)
*B33Y 10/00* (2015.01)
*B33Y 30/00* (2015.01)

(56) References Cited

U.S. PATENT DOCUMENTS

2016/0250712 A1* 9/2016 Cheng .................. B22F 7/04
219/58
2018/0015671 A1 1/2018 Sandstrom et al.

FOREIGN PATENT DOCUMENTS

| | | |
|---|---|---|
| FR | 3068290 | 1/2019 |
| JP | 2015099922 | 5/2015 |
| WO | 9705970 | 2/1997 |
| WO | 2016124708 | 8/2016 |

* cited by examiner

[Fig. 1]
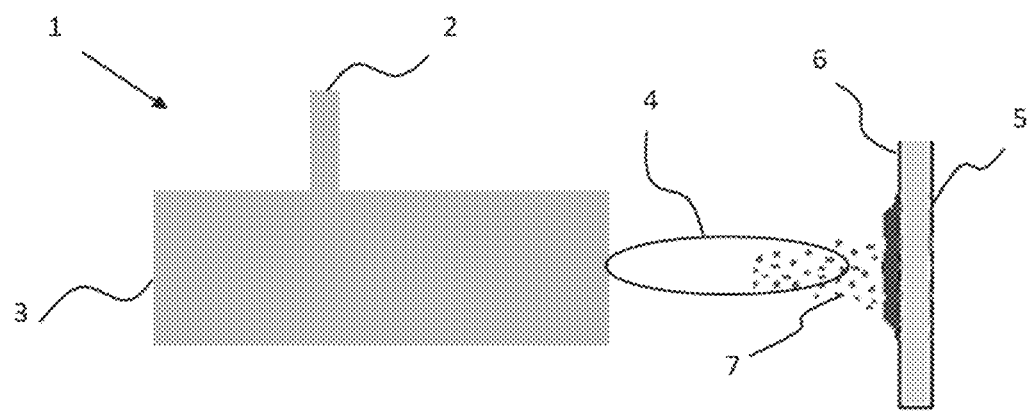

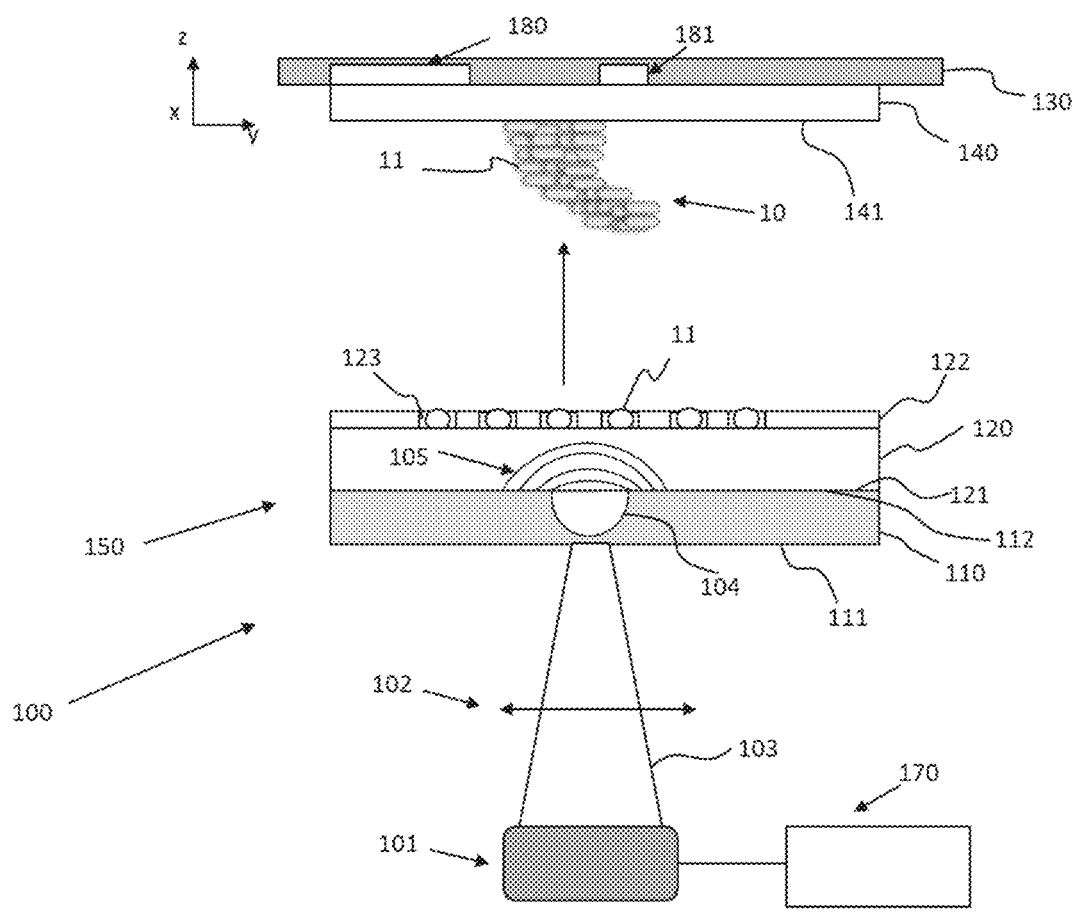
[Fig. 2]

[Fig. 3]
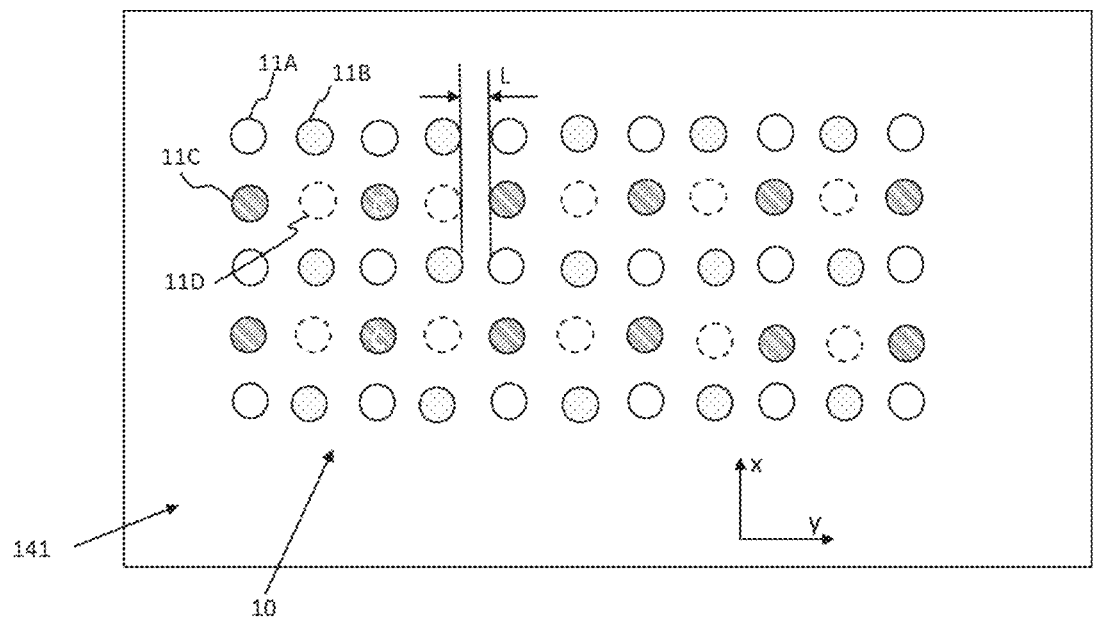
[Fig. 4]
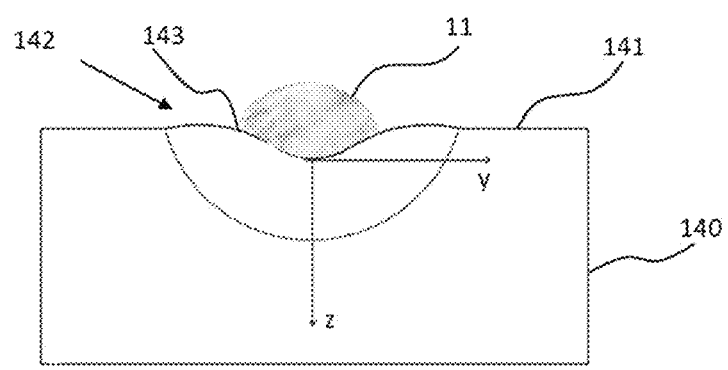

[Fig. 5]
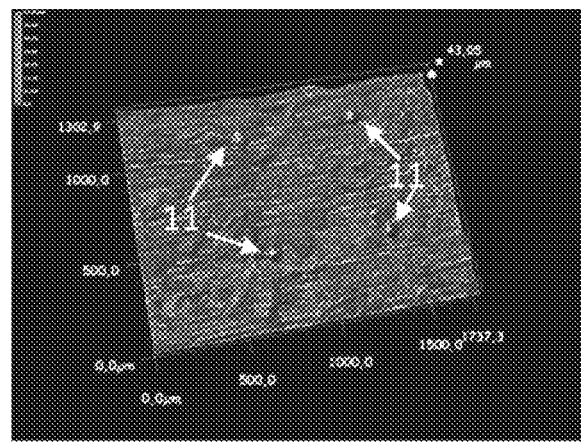
[Fig. 6]
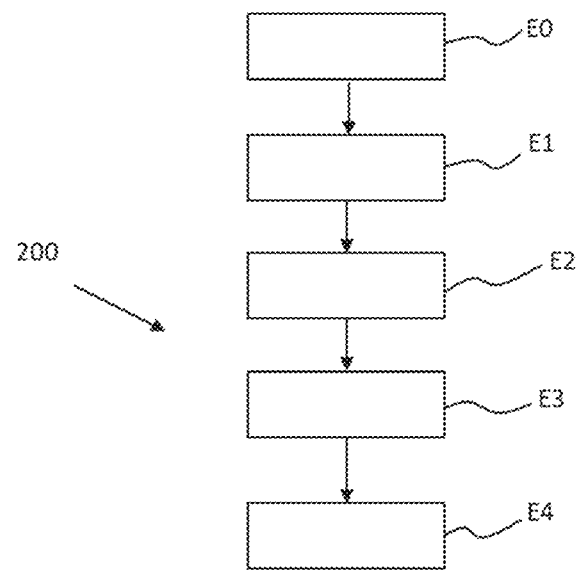

EQUIPMENT AND METHOD FOR DEPOSITING PARTICLES USING LASER SHOCKWAVES

CROSS-REFERENCE TO RELATED APPLICATIONS

This application is a National Stage of International Application No. PCT/FR2020/051941, having an International Filing Date of 27 Oct. 2020, which designated the United States of America, and which International Application was published under PCT Article 21(2) as WO Publication No. 2021/084201 A1, which claims priority from and the benefit of French Patent Application No. 1912143, filed on 29 Oct. 2019, the disclosures of which are incorporated herein by reference in their entireties.

BACKGROUND

Field

The present disclosure concerns equipment for depositing particles by spraying using laser shockwaves. The present disclosure also concerns a method for depositing particles by spraying using laser shockwaves. To be more precise, the method of the present disclosure consists in carrying out particle by particle spraying at the correct position and at the correct speed onto particular zones of a target with a view to producing local surface treatment or functionalization of the zones of the target or to producing a three-dimensional part by juxtaposition of deposition on a target zone.

The present disclosure applies in particular to the production of complex patterns on the microscopic and/or mesoscopic scale on substrates or parts.

The present disclosure also applies to the targeted treatment of the surface of a coating by depositing by spraying, particle by particle, in target zones in order to reduce the roughness of the surface of a part produced for example by additive manufacture.

The technical field of the present disclosure may be defined in a general manner as that of laser-assisted spraying.

Brief Description of Related Developments

It is known to use thermal spraying in many industrial fields such as automotive, aerospace, to produce the deposition on substrates or parts of thick coating layers with a thickness from a few tens of micrometers to a few hundreds of even thousands of micrometers.

FIG. 1 illustrates an example of prior art thermal spraying equipment 1 comprising an inlet 2 for the material to be deposited and an inlet 3 for the energy source. Thermal projection consists in introducing the material to be deposited in the form of fine particles 7 into a gas 4, termed the spraying gas. The gas is used to accelerate, heat and transport to the part to be coated fine particles 7 that come to impact the surface 6 of a substrate 5. These fine particles 7, solid in the initial state, may be in the liquid, semi-molten or even solid state after passing into the spraying gas. The particles sprayed onto the substrate are therefore crushed and spread in various ways depending on their kinetics, their state after passing into the gas, their temperature, the material of the substrate, etc. The accumulation of the particles on the substrate enables coating to be carried out by stacking these particles.

There are many ways to produce a deposit by thermal spraying. One known technique is plasma spraying enabling metal or ceramic coatings to be produced. It is more particularly used for the deposition of ceramic coatings for coating parts of varied geometry and size. Plasma spraying consists in ejecting the material to be deposited in the form of particles into a plasma medium in which they are heated and accelerated toward a substrate. The coating is constructed by successive stacking of molten or partly molten particles that impact the substrate, where they are cooled. The thickness of the coating is generally between 500 µm and 1 mm inclusive.

Another known technique is a cold spray (CS) process. The metal powders are sprayed at very high speed by a pressurized gas (up to 50 bar and 1100° C.) onto a target that is a new part or a part to be repaired. A convergent-divergent tube (De-Laval type) enables the temperature and the pressure of the gas to be transformed into kinetic energy, driving its acceleration to a supersonic speed and its cooling to a temperature below 100° C. The powders injected into the high-pressure zone of the spray nozzle are accelerated to speeds that can reach 1200 m/s. The deformation of the particles on impact makes it possible to obtain coatings having a very dense structure and very good adhesion.

In the thermal spraying technique, to obtain good mechanical adhesion of the coating layer on the substrate it is necessary to prepare the surface using abrasive materials such as sand, corundum and/or ice in order to create asperities on the surface of the substrate so as to be able to anchor the particles. Prior to deposition, adhesion tests, which are known methods, are generally carried out in order to define a satisfactory range of adhesion relative to a specification. In fact, if the adhesion is mediocre the particles cannot become attached to the surface of the substrate during deposition or the coating obtained may easily become detached during the production of a part, for example. The surface preparation techniques can introduce residues on the surface of the substrate and are therefore not suitable for all substrates or all parts.

Moreover, plasma spraying uses a powder as the additive material, with grain sizes greater than around ten micrometers. In the case of obtaining nanometer or micron structures, this necessitates reduction of the size of the elementary particles. Moreover, injecting a particle into a plasma jet by means of a vector gas requires that the quantity of movement of the particles coincide with that of the spraying gas or is at least slightly greater than the latter to enable the particles to penetrate well into the spraying gas. Consequently, if the mass of the particles decreases good control of the particle size distribution and the injection parameters (gas flow rate, injector diameter and position of the injector relative to the jet) is necessary so as to limit the dispersion of the powder in the jet in order to obtain an optimum spraying trajectory of the particles onto the target.

As a general rule, the prior art solutions do not enable selective deposition by particle by particle spraying in a particular zone of a part, for example, in particular with micron spatial resolution.

Moreover, the prior art solutions do not enable different materials to be deposited locally on a target zone in such a manner as to generate for example multi-phase coatings. By multi-phase coatings is meant composite coatings formed of at least two different materials or of at least two material phases.

Moreover, another problem that the present disclosure aims to remedy concerns difficulties linked to the deposition of particles from a nozzle. In fact, to obtain high spatial resolutions it is necessary to control the section of the nozzle and the density of the particles.

Also, the present disclosure aims to remedy the disadvantages of the prior art by proposing equipment and a method enabling particle by particle deposition of material on substrates and parts to be carried out with high precision to obtain a microstructured coating having excellent or improved adhesion properties without having recourse to preparation of the surface of the substrate. In particular, the equipment and the method of the present disclosure enable deposition of a wide range of materials, in particular in such a manner as to form complex multi-phase patterns based on particle by particle assemblies.

SUMMARY

There is proposed equipment for selectively depositing by shockwave-induced spraying at least one particle onto a deposition surface of a receiver substrate, said equipment comprising:
- at least one laser source configured to emit a laser beam, said laser beam being made up of a series of light pulses;
- a substrate carrier to which the substrate is fastened;
- a shockwave-generating layer comprising a first surface that is oriented toward the laser beam and a second surface that is oriented toward the deposition surface of the substrate;
- an optical system for directing and focusing said laser beam toward a focal region of the first surface of the generating layer;
- said second surface comprising a plurality of cavities, each of the cavities housing at least one particle;
- said laser beam being configured to generate a plasma in the focal region on the first surface of the generating layer and a shockwave that propagates within the generating layer from the first surface to the second surface of the generating layer in order to eject at least one particle in the direction of the deposition surface of the substrate.

There is meant by "particle" in the sense of the present disclosure a metal particle, in particular micron particles.

By micron particles is meant particles having a size between 1 and 100 µm inclusive.

The equipment and the method according to the present disclosure advantageously enable the use of the laser shockwave technique for depositing particles in a selective manner, particle by particle, on the surface of a substrate and construction in a target zone of a three-dimensional part formed from particles.

Thanks to the solution proposed in the present disclosure, it is no longer necessary to carry out preparation of the surface of the substrate beforehand, such as sandblasting, in order to increase the roughness of the surface to favor mechanical anchoring of the particles. In other words, it is no longer necessary to modify the state of the surface of the substrate to ensure adhesion between the coating and the substrate. Because of this, it is for example possible to produce deposits of particles on fragile parts, in particular medical parts or jewelry parts.

The equipment and the method according to the present disclosure advantageously make it possible to produce patterns on the micron scale on substrates or parts of complex shape or to functionalize locally an area of interest of a substrate.

By eliminating the use of the carrier gas and using only the shockwave generated by the plasma to spray the particles one by one onto the deposition surface of the substrate, the proposed technical solution makes it possible to avoid the technical constraints and problems linked to controlling the quantity of movement of the particles and controlling the section of the nozzle as in the prior art, and to allow deposits whatever the nature of the surface of the substrate, the nature of particles, the shape and the geometry of the substrate.

Thanks to the deposition of particles one by one and in a selective manner it is possible to construct 2D or 3D micron patterns on a target zone of an existing metal part or to obtain a part by accumulation of particles on one another.

The solution proposed by the present disclosure also makes it possible to treat the surface roughness of a part obtained by additive manufacture. In fact, parts obtained by an additive manufacturing process generally have an arithmetic roughness (Ra) of the profile from a few micrometers to a few tens of micrometers. This roughness is associated with the stacking of successive layers specific to the additive manufacturing process and also with the presence of grains of powder that have clumped together on the surface of the part. The method of the present disclosure enables the deposition of particles of the same nature as the material of the part one by one in the rough zones in order to reduce the surface roughness.

The proposed solution also makes it possible to densify a target zone of a part in order to improve the fatigue properties of the part.

In accordance with one embodiment of the present disclosure, the equipment further comprises a confinement layer transparent at the wavelength of the laser beam and covering the first surface of the generating layer, said confinement layer being configured to confine the plasma generated at the level of the first surface of the generating layer. This confinement layer is a layer of glass or a layer of water.

In accordance with one embodiment of the present disclosure, the equipment further comprises a system for controlling the laser source configured to command an energy level of the laser beam.

In accordance with one embodiment of the present disclosure, the control system comprises a computer configured to determine an optimum energy level of the laser beam on the basis of a digital model as a function of the size of the particle, of the material of the particle, of the material of the receiver substrate, of the material of the generating layer, and of the thickness of the generating layer.

In accordance with one embodiment of the present disclosure, the equipment further comprises a heating means for heating the substrate.

In accordance with one embodiment of the present disclosure, the equipment further comprises a temperature sensor configured to measure the temperature of the substrate.

In accordance with another embodiment of the present disclosure, the equipment further comprises an image acquisition system, such as a video camera.

The features disclosed in the following paragraphs may optionally be employed. They may be employed independently of one another or in combination with one another:
- the confinement layer has a thickness between 200 and 5000 µm inclusive;
- the shockwave-generating layer has a thickness between 200 and 3000 µm inclusive;
- the laser source is configured to emit a laser beam consisting of a series of light pulses with a pulse duration between 1 and 5 nanoseconds inclusive, with an energy level between 1 and 10 joules inclusive;

each cavity comprises at least two housings, each of the housings housing a particle;

the particles have a diameter between 5 µm and 100 µm inclusive.

In accordance with another aspect, the present disclosure also proposes a method of depositing particles using the deposition equipment described hereinabove, comprising the following steps:

in a first step (E1), generating a laser beam consisting of a series of light pulses;

in a second step (E2), directing the laser beam towards the first surface of the generating layer and focusing the laser beam at the level of a focal region on the first surface of the generating layer;

in a third step (E3), adjusting the energy level of the laser beam in such a manner as to generate a plasma at the level of the first surface of the shockwave-generating layer;

in a fourth step (E4), generating shockwaves in the generating layer, the shockwaves propagating from the first surface in the direction of the second surface of the generating layer to eject at least one particle in the direction of the deposition surface of the substrate.

In accordance with one embodiment of the present disclosure, the energy level of the laser beam is calculated on the basis of a digital model as a function of the size of the particle, of the material of the particle, of the material of the receiver substrate, of the material of the generating layer, of the thickness of the generating layer.

In accordance with another embodiment of the present disclosure, the method further comprises a preliminary step (E0) of calibration of the energy level of the laser beam comprising the following steps:

repeating the steps E1 to E4 to deposit at least one particle on a calibration region of the deposition surface of a substrate, acquiring at least one image of the impact zone of said particle on the deposition surface of the substrate, evaluating the plastic deformation of the particle and of the impact zone of the deposition surface of the substrate as a function of the energy level of the laser beam, determining the optimum energy level of the laser beam.

BRIEF DESCRIPTION OF THE DRAWINGS

Other features, details and advantages of the present disclosure will become apparent on reading the following detailed description and analyzing the appended drawings, in which:

FIG. 1 shows a prior art thermal particle spraying device;

FIG. 2 shows equipment in accordance with one embodiment of the present disclosure for selective deposition of particles by laser shockwave spraying;

FIG. 3 shows an example of a pattern produced by means of the equipment from FIG. 2;

FIG. 4 shows a schematic view of the state of a particle upon its impact on the surface of a target;

FIG. 5 shows a 3D image observed through an optical microscope of the surface of a pattern composed of four particles, the pattern having been produced by means of the equipment in accordance with one embodiment of the present disclosure;

FIG. 6 is a flowchart of the method in accordance with one embodiment of the present disclosure of depositing particles.

DETAILED DESCRIPTION

The drawings and the description hereinafter essentially contain elements of a certain character. They could therefore serve not only to explain better the present disclosure but also to contribute to its definition if necessary.

In FIG. 2 there has been represented equipment 100 in accordance with one embodiment of the present disclosure for selective deposition by laser-shockwave-induced spraying. In accordance with this embodiment, the equipment comprises a laser source 101 configured to emit a laser beam 103 that is defined by the following parameters: its wavelength, its frequency, its energy, its diameter and its pulse duration. The parameters of the laser source can preferably be set so as to adjust at least one of the parameters, in particular its energy level.

By way of example, and in particular in the example of use of the particle deposition equipment to deposit four particles at a speed of 500 m/s (FIG. 5), the stream of laser pulses has a duration equal to 40 ns at a wavelength of 1064 nm. The laser beam is emitted with an energy of 10 J.

The equipment also comprises a substrate carrier 130 to which is fixed a receiver substrate 140 intended to receive the particles sprayed by the equipment. To be more precise, the receiver substrate comprises a first and free deposition surface 141 oriented toward the laser beam and a second surface fixed to the support. The support is mounted on a mobile plate moving in a horizontal plane (X, Y) perpendicular to the direction of the laser beam to move the position of deposition of the particle. The support 130 can be oriented in the three directions in order to offer up the deposition surface perpendicularly to the laser beam in such a manner as to maximize the adhesion between the particle and the deposition surface. Moreover, this kind of support enables complex patterns to be produced.

In the present disclosure the deposition surface 141 corresponds to the surface of a substrate for the particles of the first layer or to the surface of the layer deposited on the receiver substrate for the particles of the next layer.

The deposition equipment 100 further comprises an optical system 102 that enables adjustment of the focus along an axis Z perpendicular to the deposition surface.

The laser source 101 and the optical system 102 are not described further because they are known to the person skilled in the art and may be similar to those from the prior art.

The deposition equipment also comprises at least one particle donor support 150.

As illustrated in FIG. 2 and in accordance with one embodiment of the present disclosure, the donor support 150 comprises a plasma confinement layer 110 and a shockwave-generating layer 120.

The confinement layer 110 has a first and free surface 111 oriented toward the laser beam and a second surface 112. The shockwave-generating layer 120 has a first surface 121 having a contact interface with the second surface 112 of the confinement layer 110 and a free second surface 122. The free second surface 122 comprises a plurality of cavities 123, each of the cavities being configured to house a particle 11.

Thus the plasma confinement layer 110 and the shockwave-generating layer 120 form the particle donor support 150 in the form of a stack.

The deposition equipment also comprises a second mobile plate (not illustrated) on which the donor support 150 is removably mounted, the mobile plate moving in a horizontal plane X, Y perpendicular to the direction of the laser beam.

Accordingly, thanks to the second mobile plate, it is possible to move the position of the focus of the laser beam on the first surface 121 of the shockwave-generating layer 120 in such a manner as selectively to spray the particles one by one onto a target zone of the deposition surface 141 of the substrate 140. Thus it is possible to choose one particle 11 in particular and to spray that selected particle onto a particular zone of the deposition surface.

In accordance with one embodiment of the present disclosure, the deposition equipment comprises a system for command and control of the movement of the receiver substrate 140 and of the donor substrate 150 via the plates with micrometer precision and orientable with respect to six axes in order to generate complex shapes.

In accordance with another embodiment of the present disclosure, the deposition equipment comprises a command and control system for each plate.

The confinement layer 110 is made of a material transparent at the wavelength of the laser beam. This layer may equally be water in a container. The optical system 102 is configured to focus the laser beam 103 onto the first surface 121 of the shockwave-generating layer through the confinement layer.

The function of this confinement layer 110 is to slow down the volume expansion of the plasma generated at the interface 121 in such a manner as to generate a higher pressure, thereby enabling the pressure on the first surface of the shockwave-generating layer 120 to be increased. Moreover, the presence of the confinement layer also enables the duration of application of the pressure to be increased. The confinement layer 110 preferably has a thickness between 200 µm and 5000 µm inclusive. The confinement layer is a dielectric layer. It is preferably made of glass. It may equally be replaced by distilled water or a film of transparent adhesive tape.

The shockwave-generating layer 120 is made of metal, for example of aluminum, or a plastic material that is absorbent at the wavelength of the laser beam. It has a thickness between 200 µm and 3000 µm inclusive. In accordance with a known physical phenomenon, if a photon pulse of short duration and high power is focused on the first surface 121 of the generating layer 120 the laser-material interaction is reflected first in penetration of the laser beam within the thickness of the generating layer creating a zone of absorption of the laser energy. The thickness of penetration of the optical waves in the solid is of the order of a few nanometers. Because of the very short duration of the pulse and the high power of the beam, the temperature is greatly increased in this zone and a very small thickness of the material of the generating layer sublimates. Ionized vapor is then in contact with the laser beam and generates a hot and dense plasma that continues to absorb energy throughout the duration of the pulse.

The expansion of the plasma generated at the level of the first surface of the generating layer exerts pressure on the first surface of the generating layer. This surface stress generates compression waves within the thickness of the shockwave-generating layer 120, giving rise to a mechanical shockwave with an amplitude that can reach a few tens of GPas propagating in the direction of the second surface 122. The shockwave created in this way propagates locally from the first surface 121 of the generating layer to the second surface 122 of the generating layer. Because of the effect of the shockwave, which will exert pressure on the particle housed in the cavity, the latter particle is sprayed in the direction of the deposition surface 141 of the receiver substrate 140.

The particles have a diameter between 5 and 100 µm inclusive. The substrate has a thickness between 500 and 2000 µm inclusive. The particles are deposited with the aid of a laser source enabling generation of a laser beam with a wavelength of 1064 nm and with a pulse duration between 1 and 5 ns inclusive. The diameter of the laser beam at the focus point is generally between 500 and 2000 µm inclusive. The energy of the laser beam is between 5 and 10 joules inclusive.

In accordance with another embodiment of the present disclosure, not illustrated, the cavity may comprise a plurality of housings, each of the housings being sized to receive a particle.

In an advantageous manner, the arrangement of the cavities on the free surface 122 of the shockwave-generating layer forms directly the pattern it is wished to imprint on the deposition surface. Accordingly, when the particles are sprayed onto the deposition surface of the receiver substrate, the deposited particles form the required pattern directly. Spraying the particles thus makes it possible to deposit them and to transfer the pattern at the same time.

The cavities have a circular or oval section or a section of other geometric shape. The cavities can be produced in particular by a known laser texturing treatment. The cavities generated in this way have a micron dimension of the same order of magnitude as the particles.

Accordingly, the equipment of the present disclosure enables patterns to be produced by particle by particle deposition onto the deposition surface of a substrate from a donor support using laser shockwaves.

The pattern may comprise a single layer formed of a plurality of particles. The pattern may equally comprise a plurality of layers as illustrated in FIG. 2, each of the layers being formed of a plurality of particles.

In accordance with one embodiment of the present disclosure, the selective deposition equipment comprises a frame supporting a plurality of particle donor supports 150, each of the supports being provided with one type of particles and one pattern. The frame is associated with a system of axes X, Y, Z. The various supports are fixed to the frame and moved in a direction X and in a direction Y in such a manner as to move the donor support in front of the deposition surface of the substrate.

FIG. 3 illustrates an example of a pattern 10 of particles forming an array of particles on the deposition surface 141 of the substrate. In accordance with this example, the pattern comprises four types of particles 11A, 11B, 11C, 11D that are arranged at a regular interval L.

In accordance with one embodiment of the present disclosure and as FIG. 2 illustrates, the laser beam 103 and the direction of spraying of the particles are oriented in the opposite direction to the gravitational force. In the configuration illustrated in FIG. 2 the free surface 122 of the shockwave-generating layer 120 is oriented upward, in the direction of the deposition surface 141 of the substrate. During spraying the particle is ejected from the cavity in which it is housed in an upward direction, the opposite direction to the gravitational force. In this configuration, the particles can therefore be easily retained in the cavities in the shockwave-generating layer. In the situation where the confinement layer 110 is composed of water, the shockwave-generating layer is immersed in the water.

Determination of the Optimum Critical Speed of a Particle at the Moment of its Impact on a Substrate The adhesion of the particle to the substrate is a predominant factor in the determination of the performance of a coating.

There is meant by "adhesion" in the sense of the present disclosure the state in which the particle and the substrate are bonded.

The adhesion of a particle on the substrate is governed mainly by the critical speed of impact of the particle.

There is meant by critical speed in the sense of the present disclosure a speed below that at which the particle does not adhere to the substrate.

Under optimum conditions the impact speed leads to shear forces. The friction between the two solid materials and the plastic deformation that they undergo provoke a local temperature rise in the material. The particle and the impact zone of the substrate undergo plastic deformation that produces a bond between the particle and the substrate.

FIG. 4 illustrates schematically the plastic deformations undergone by the particle 11 and the impact zone 142 of the substrate at the moment of the impact of the particle on the substrate 140. Adhesion is reflected in driving of the particle into the substrate and the formation of a hollow zone 143 at the level of the impact zone.

The behavior of a particle arriving at high speed, at the moment of the impact on the substrate, has been simulated by a finite-element calculation for a sphere crashing onto a plane. Using a known model, the impact of a particle on a substrate has been modeled by means of a Johnson-Cook type behavior law. On the basis of this model, it is possible to simulate the phenomenon of plastic deformation of a particle on its impact on the substrate and to calculate the optimum critical kinetic speed for the adhesion of the particle on the substrate as a function of the parameters comprising the size of the particle, the material of the particle and the material of the substrate.

Determination of the Ejection Speed of the Particle

The optimum critical speed that enables adhesion of the particle on the substrate is linked directly to the speed at which the particle is ejected from the cavity by the effect of the shockwave. The ejection speed is therefore linked to the shockwave generated by the laser beam in the shockwave-generating layer.

In accordance with a known model, on the basis of the Hugoniot relations (laws of conservation of state in a medium), the Mie-Grüneisen state equation and the linear relation linking the speed of the shockwave and the material speed, it is possible to model the propagation of the shockwave in the generating layer. On the basis of these equations, it has therefore been possible to determine the speed at which the particle will be ejected as a function of the amplitude of the shockwave induced by the laser beam, and therefore the pressure exerted by the plasma created by the laser beam. Because of this it is then possible to determine the optimum energy level of the laser beam to obtain the optimum speed of spraying the particles as a function of the material of the generating layer and the thickness of the generating layer.

Accordingly, the speed of spraying the particle because of the effect of the shockwave and the critical speed of the particle at the moment of impact on the substrate vary as a function of the size of the particle, the material of the particle, the material of the substrate, the thickness and the material of the shockwave-generating layer, and the energy level of the laser beam.

Knowing the size of the particle, the material of the particle, the material of the receiver substrate, the thickness and the material of the generating layer, it is possible to adjust the energy level of the laser beam to obtain the critical kinetic energy of the particle at the moment of its impact on the substrate to obtain good adhesion between the particle and the deposition surface of the substrate.

FIG. 5 illustrates an example of depositing four particles of copper on an aluminum substrate using laser shockwaves.

The generating layer 110 is an aluminum layer with a thickness of 500 μm. The confinement layer is a layer of glass and has a thickness of 5 mm. The free surface 122 of the generating layer includes four cavities each containing a copper particle.

The shockwave has made it possible to spray the four particles onto the deposition surface. The speed of the particles is 500 m/s, which is an experimental value.

The method in accordance with one embodiment of the present disclosure of depositing particles by laser shockwave spraying on the deposition surface of a substrate is described in detail next hereinafter with reference to FIG. 6.

In a first step (E1), the optimum energy level of the beam is calculated in a computer from a known numerical model. In this model, the size of the particle, the material of the particle, the material of the receiver substrate, the thickness of the receiver substrate, the thickness of the shockwave-generating layer, the material of the generating layer are known parameters. It is therefore possible to adjust the energy level of the laser beam to obtain the critical kinetic energy of the particle at the moment of its impact on the substrate in order to obtain good adhesion between the particle and the deposition surface of the substrate.

In a second step (E2), the control system of the laser source commands the laser source to emit a laser beam with the required parameters: the energy level transmitted by the computer, the wavelength, the pulse duration. The laser beam is focused onto the first surface of the generating layer via the confinement layer. In the example illustrated in FIG. 5 of the present disclosure, the laser source operates for example at a wavelength of 1064 nm with a pulse duration of 5.1 ns and an energy level of 1 joule.

In a third step (E3) a plasma is generated at the surface of the interface between the confinement layer 110 and the shockwave-generating layer 120 which is a result of the absorption of the energy of the laser beam by the generating layer. The plasma is created over an extremely short time period, typically a few nanoseconds after the absorption of the laser beam.

In a fourth step (E4) a shockwave is generated in the generating layer and propagates in the direction of the free second surface 122 carrying particles. This shockwave is the result of the pressure exerted by the plasma on the surface of the generating layer. The shockwave arriving at the free surface 122 causes spraying of the particle housed in the cavity of the second 122 in the direction of the deposition surface 141 of the substrate 140.

In accordance with one embodiment of the present disclosure, the method comprises a preliminary step (E0) of calibration of the critical speed of the particle, the critical speed being the speed of the particle at the moment of its impact on the deposition surface of the substrate in order to obtain good adhesion between the particle and the substrate. This calibration step therefore makes it possible to validate the numerical model with experimental tests depositing particles using laser shockwaves on a test substrate. This calibration step may also be carried out on a specific region of a substrate dedicated to calibration.

This preliminary calibration step consists in repeating the steps E1 to E4 to deposit a particle on a calibration region of the deposition surface of a substrate with different energy levels of the laser beam calculated on the basis of the numerical model.

In this preliminary step, following the step E4, the steps are:
- acquiring at least one image of the impact zone of said particle on the deposition surface of the substrate, then evaluating the plastic deformation of the particle and of the impact zone of the deposition surface of the receiver substrate as a function of the energy level of the laser beam,
- determining the optimum energy level of the laser beam.

In accordance with a first embodiment of the present disclosure, the particle deposition equipment comprises an image acquisition system such as a high-speed video camera the image acquisition frequency of which between 1000 and 50000 Hz is synchronized with the pulse frequency of the laser source. The image acquisition system enables real time acquisition, during the deposition procedure, of at least one image of the state of the particle just after its impact on the deposition surface of the substrate as a function of various energy levels of the laser beam that have been calculated.

The three-dimensional characterizations of the state of the particle enable qualitative control of the plastic deformation of the particle and of the impact zone of the deposition surface of the substrate and evaluation of the quality of adhesion between the particle and the substrate. The preliminary calibration step enables determination of the optimum energy level of the laser beam that will be used subsequently to deposit the particles to form the complex pattern or the part.

The present disclosure may find an application in particular for producing:
- jewelry pieces with complex geometries;
- medical components;
- finish coatings in target zones in order to reduce the roughness of the surface of the parts obtained in particular by additive manufacturing;
- coatings enabling modification of the physical properties of a zone;
- electrofunctional coatings;
- anti-corrosion coatings.

By way of nonlimiting example, the particles may be of:
- precious materials: gold, silver, platinum, or semi-precious materials;
- ceramic materials;
- standard metals.

By way of nonlimiting example, the substrate may be of:
- precious materials: gold, silver, platinum, or semi-precious materials;
- metals;
- composite materials; and
- ceramics.

What is claimed is:

1. Deposition equipment for selectively depositing at least one particle by shockwave-induced spraying onto a deposition surface of a receiver substrate, said equipment comprising: at least one laser source configured to emit a laser beam, said laser beam being made up of a series of light pulses; a substrate carrier to which the substrate is fastened; a shockwave-generating layer comprising a first surface that is oriented toward the laser beam and a second surface that is oriented toward the deposition surface of the substrate; an optical system for directing and focusing said laser beam toward a focal region of the first surface of the generating layer; said second surface comprising a plurality of cavities, each of the cavities housing at least one particle; and said laser beam configured to generate a plasma in the focal region on the first surface of the generating layer and a shockwave that propagates within the generating layer from the first surface to the second surface of the generating layer to eject the at least one particle in the direction of the deposition surface of the receiver substrate.

2. The deposition equipment as claimed in claim 1, further comprising a confinement layer transparent at a wavelength of the laser beam and covering the first surface of the generating layer, said confinement layer configured to confine the plasma generated at a level of the first surface of the generating layer.

3. The deposition equipment as claimed in claim 2, in which said confinement layer is a layer of glass or a layer of water.

4. The deposition equipment as claimed in claim 2, in which said confinement layer has a thickness between 200 and 5000 µm inclusive.

5. The deposition equipment as claimed in claim 1, further comprising a system for controlling the at least one laser source configured to command an energy level of the laser beam.

6. The deposition equipment as claimed in claim 5, in which the system for controlling comprises a computer configured to determine an optimum energy level of the laser beam on the basis of a digital model as a function of a size of the at least one particle, of a material of the at least one particle, of a material of the receiver substrate, of a material of the generating layer, and of a thickness of the generating layer.

7. The deposition equipment as claimed in claim 1, further comprising a heating means for heating the substrate.

8. The deposition equipment as claimed in claim 1, further comprising a temperature sensor configured to measure a temperature of the substrate.

9. The deposition equipment as claimed in claim 1, further comprising an image acquisition system, comprising a video camera.

10. The deposition equipment as claimed in claim 1, in which said at least one laser source is configured to emit the laser beam consisting of the series of light pulses with a pulse duration between 1 and 5 nanoseconds inclusive, and with an energy level between 1 and 10 joules inclusive.

11. The deposition equipment as claimed in claim 1, in which each cavity comprises at least two housings, each of the housings housing a particle.

12. The deposition equipment as claimed in claim 1, in which said at least one particle having a diameter between 5 µm and 100 µm inclusive.

13. A method of depositing particles using the deposition equipment as claimed in claim 1, comprising the following steps:
- in a first step (E1), generating the laser beam consisting of the series of light pulses;
- in a second step (E2), directing the laser beam toward the first surface of the generating layer and focusing the laser beam at a level of the focal region on the first surface of the generating layer;
- in a third step (E3), adjusting an energy level of the laser beam to generate the plasma at the level of the first surface of the shockwave-generating layer;
- in a fourth step (E4), generating shockwaves in the generating layer, the shockwaves propagating from the first surface in the direction of the second surface of the generating layer to eject the at least one particle in the direction of the deposition surface of the substrate.

14. The deposition method as claimed in claim 13, in which the energy level of the laser beam is calculated on the basis of a digital model as a function of a size of the at least one particle, of a material of the at least one particle, of a material of the receiver substrate, of a material of the generating layer, and of a thickness of the generating layer.

15. The deposition method as claimed in claim 13, further comprising a preliminary step (E0) of calibration of the energy level of the laser beam comprising the following steps:
- repeating the steps E1 to E4 to deposit the at least one particle on a calibration region of the deposition surface of the substrate,
- acquiring at least one image of the impact zone of said at least one particle on the deposition surface of the substrate,
- evaluating plastic deformation of the at least one particle and of an impact zone of the deposition surface of the receiver substrate as a function of the energy level of the laser beam,
- determining an optimum energy level of the laser beam.

* * * * *